(12) United States Patent
Ohtsuka et al.

(10) Patent No.: US 9,495,090 B2
(45) Date of Patent: Nov. 15, 2016

(54) INPUT CONTROL DEVICE, ELECTRONIC INSTRUMENT, INPUT CONTROL METHOD, PROGRAM, AND RECORDING MEDIUM

(71) Applicant: Sharp Kabushiki Kaisha, Osaka-shi, Osaka (JP)

(72) Inventors: Kiyofumi Ohtsuka, Osaka (JP); Hirokazu Ishikawa, Osaka (JP); Megumi Yokogawa, Osaka (JP); Shinya Satoh, Osaka (JP); Tatsuo Kishimoto, Osaka (JP); Yuhichi Yabuki, Osaka (JP); Tadao Nagasawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 251 days.

(21) Appl. No.: 14/353,871

(22) PCT Filed: Feb. 15, 2013

(86) PCT No.: PCT/JP2013/053760
§ 371 (c)(1),
(2) Date: Apr. 24, 2014

(87) PCT Pub. No.: WO2013/122230
PCT Pub. Date: Aug. 22, 2013

(65) Prior Publication Data
US 2014/0298251 A1 Oct. 2, 2014

(30) Foreign Application Priority Data
Feb. 16, 2012 (JP) .................................. 2012-032175

(51) Int. Cl.
G06F 3/048 (2013.01)
G06F 3/0485 (2013.01)
G06F 3/0488 (2013.01)

(52) U.S. Cl.
CPC ........... *G06F 3/0485* (2013.01); *G06F 3/0488* (2013.01); *G06F 3/04883* (2013.01)

(58) Field of Classification Search
None
See application file for complete search history.

(56) References Cited

U.S. PATENT DOCUMENTS

2003/0122787 A1* 7/2003 Zimmerman ....... G06F 3/04883
345/173
2009/0158222 A1* 6/2009 Kerr ........................ G06F 3/016
715/867

(Continued)

FOREIGN PATENT DOCUMENTS

JP 2009-301092 A 12/2009

*Primary Examiner* — Hua Lu
(74) *Attorney, Agent, or Firm* — Birch, Stewart, Kolasch & Birch, LLP

(57) ABSTRACT

A touch control section (5) includes: an operation accepting section (51) which accepts a touch operation conducted with respect to an icon or the like; and an accepting operation control section (52) which controls the operation accepting section (51) to forbid an accepting operation in a case where screen scroll is started. In a case where screen scroll is started, the accepting operation control section (52) controls the accepting operation control section (52) to lift the forbiddance of an accepting operation before the screen scroll automatically stops.

11 Claims, 12 Drawing Sheets

(56) References Cited

U.S. PATENT DOCUMENTS

| | | | |
|---|---|---|---|
| 2010/0235089 A1* | 9/2010 | Kato | G06F 3/04845 |
| | | | 701/533 |
| 2010/0275150 A1* | 10/2010 | Chiba | G06F 3/0488 |
| | | | 715/784 |
| 2011/0185308 A1* | 7/2011 | Machida | G06F 3/0485 |
| | | | 715/784 |
| 2012/0072863 A1* | 3/2012 | Akifusa | G06F 3/0482 |
| | | | 715/784 |
| 2014/0118782 A1* | 5/2014 | Tamai | H04N 1/00413 |
| | | | 358/1.15 |

\* cited by examiner (a)

(b)

INPUT CONTROL DEVICE, ELECTRONIC INSTRUMENT, INPUT CONTROL METHOD, PROGRAM, AND RECORDING MEDIUM

TECHNICAL FIELD

The present invention relates to an input control device and a method of carrying out input control, each of which controls an acceptance of an operation conducted via a touch panel.

BACKGROUND ART

FIG. 11 is a block diagram illustrating a configuration of a conventional mobile phone 100. The mobile phone 100 includes a display section 102, a touch panel 103, a display control section 104, and a touch control section 105.

A flat display device is employed as the display section 102. Examples of the flat display device include a liquid crystal display.

The display control section 104 controls, in accordance with an instruction issued by a CPU (not illustrated), the display section 102 to, for example, scroll a displayed screen or switch one screen to another.

The touch panel 103 is an input device via which a user conducts a touch operation on a display screen of the display section 102. In a case where a touch operation is conducted with respect to the touch panel 103, the touch panel 103 supplies, to the touch control section 105, a signal in accordance with a touched position.

The touch control section 105 processes a signal received from the touch panel 103. The touch control section 105 includes (i) an operation accepting section 1051 which accepts an operation conducted via the touch panel 103 and (ii) an accepting operation control section 1052 which controls an accepting operation of the operation accepting section 1051.

The operation accepting section 1051 determines, in accordance with a signal received from the touch panel 103, a content of an input operation conducted with respect to the touch panel 103 and then supplies, to a CPU (not illustrated), information in accordance with the content of the input operation.

The accepting operation control section 1052 controls the operation accepting section 1051 to forbid/permit an accepting operation. Particularly, out of accepting operations conducted by the operation accepting section 1051, the accepting operation control section 1052 controls the operation accepting section 1051 to forbid or permit an acceptance of a selecting operation conducted with respect to a display element, such as an icon, on a screen displayed by the display section 102 (hereinafter simply referred to as "selecting operation"). Specifically, in a case where scrolling of a screen displayed by the display section 102 (hereinafter simply referred to as a "screen scroll") is started, the accepting operation control section 1052 controls the operation accepting section 1051 to forbid (disable) an acceptance of a selecting operation until the screen scroll stops.

A flick operation means an operation of striking a touch panel with the use of a finger, a touch pen, or the like (see (a) of FIG. 12). That is, the flick operation means an operation of (i) moving a finger or the like in a desired direction on a touch panel and (ii) then immediately detaching the finger or the like from the touch panel. It is difficult to conduct an accurate selecting operation by a touch during screen scroll. Therefore, the accepting operation control section 1052 disables a selecting operation during screen scroll, thereby preventing execution of a selecting operation which a user does not intend.

A drag operation means an operation of moving a file or a folder to an intended position by sliding a finger, a touch pen, or the like on a touch panel. That is, the drag operation means an operation of (i) moving a finger or the like in a desired direction in a state where the finger or the like is in contact with a file or a folder via a touch panel and (ii) detaching the finger or the like from the touch panel in a case where the file or the folder is at an intended position.

The following description will discuss touch control carried out by the mobile phone 100 with reference to a flowchart illustrated in FIG. 13.

As illustrated in FIG. 13, in a case where (i) a touch operation with respect to the touch panel 103 is detected (Yes, in step S101) and (ii) a finger(s) is detached from the touch panel 103 (Yes, in step S102), the accepting operation control section 1052 determines whether or not the touch operation is a flick operation (S103). In a case where the finger(s) is in contact with the touch panel 3 even after a given time has elapsed (No, in step S102), processing corresponding to a drag operation or a press-and-hold operation is conducted (step S104).

In a case where (i) the touch operation is a flick operation (Yes, in step S103) and (ii) screen scroll is started (Yes, in step S105), the accepting operation control section 1052 controls the operation accepting section 1051 to forbid an acceptance of a selecting operation (step S106). In a case where the screen scroll has stopped (yes, in step S107), the accepting operation control section 1052 controls the operation accepting section 1051 to lift the forbiddance of an acceptance of a selecting operation (step S108).

Note that, in a case where the touch operation is an operation (for example, a tap operation with respect to an icon) other than the flick operation in step S103, a selection of the icon is, for example, made (step S109). In a case where the touch operation is a flick operation but screen scroll is not started because, for example, the finger(s) is moved in a direction in which a screen cannot be scrolled (no, in step S105), the accepting operation control section 1052 controls the operation accepting section 1051 not to forbid an acceptance of a selecting operation.

According to the mobile phone 100, a selecting operation is disabled during screen scroll. This makes it difficult to quickly carry on an operation of the mobile phone 100. Specifically, because the screen scroll is calculated in terms of one pixel, a moving amount of a screen becomes considerably small right before the screen scroll stops. Accordingly, a timing when a user actually feels that the screen scroll has stopped is earlier than a timing when the screen scroll completely stops. Therefore, because a user desires to quickly carry on an operation of the mobile phone 100, such a case occurred that the user conducts a selecting operation with respect to an icon or the like before the screen scroll completely stops and the selecting operation is accordingly disabled. This phenomenon particularly occurs, especially, in a case where the mobile phone 100 is operated by one hand.

In view of this, a technique has been suggested which allows a touch operation to be conducted even during screen scroll in a case where a time period during which a finger is in contact with a touch panel is equal to or less than a threshold (for example, Patent Literature 1). This makes it possible to quickly carry on a selecting operation.

CITATION LIST

Patent Literature 1

Japanese Patent Application Publication, Tokukai, No. 2009-301092 A (Publication Date: Dec. 24, 2009)

SUMMARY OF INVENTION

Technical Problem

However, according to the technique of Patent Literature 1, it is highly likely that an erroneous operation, such as a selection of an unintended icon, occurs, in a case where a selecting operation is conducted especially while a screen is being quickly scrolled. Further, according to Patent Literature 1, in a case where a tap operation is conducted during screen scroll, it is determined, depending on a time period during which a finger is in contact with a screen, whether the tap operation is conducted as a selecting operation or an operation of stopping the screen scroll. This requires a user to consciously use a selecting operation in distinction from an operation of stopping screen scroll and vice versa.

The present invention has been made in view of the above problems, and an object of the present invention is to realize an input control device and a method of carrying out input control, each of which allows a user to quickly and easily carry on an operation of an electronic device.

Solution to Problem

In order to attain the above object, an input control device in accordance with an aspect of the present invention is an input control device for use in an electronic device including a display device by which a screen is displayed so as to be scrolled, on which screen a display element, to be subjected to an operation conducted via a touch panel, is displayed, the input control device controlling an acceptance of the operation, said input control device including: operation accepting means for accepting the operation to be conducted with respect to the display element; and accepting operation control means for controlling the operation accepting means to forbid an accepting operation, in a case where scrolling of the screen is started, in a case where the scrolling of the screen is started, the accepting operation control means controlling the operation accepting means to lift forbiddance of the accepting operation before the scrolling of the screen automatically stops.

Further, in order to attain the above object, a method of carrying out input control in accordance with an aspect of the present invention includes the steps of: accepting an operation to be conducted with respect to a display element, while a screen on which the display element, to be subjected to the operation conducted via a touch panel, is being displayed; forbidding an acceptance of the operation conducted with respect to the display element, in a case where scrolling of the screen is started; and lifting forbiddance of the acceptance of the operation before the scrolling of the screen automatically stops, in a case where the scrolling of the screen is started.

Advantageous Effects of Invention

As described above, an input control device of the present invention is an input control device for use in an electronic device including a display device by which a screen is displayed so as to be scrolled, on which screen a display element, to be subjected to an operation conducted via a touch panel, is displayed, the input control device controlling an acceptance of the operation, said input control device including: operation accepting means for accepting the operation to be conducted with respect to the display element; and accepting operation control means for controlling the operation accepting means to forbid an accepting operation, in a case where scrolling of the screen is started, in a case where the scrolling of the screen is started, the accepting operation control means controlling the operation accepting means to lift forbiddance of the accepting operation before the scrolling of the screen automatically stops. Further, a method of carrying out input control of the present invention includes the steps of: accepting an operation to be conducted with respect to a display element, while a screen on which the display element, to be subjected to the operation conducted via a touch panel, is being displayed; forbidding an acceptance of the operation conducted with respect to the display element, in a case where scrolling of the screen is started; and lifting forbiddance of the acceptance of the operation before the scrolling of the screen automatically stops, in a case where the scrolling of the screen is started.

It is therefore possible to realize an input control device and a method of carrying out input control, each of which allows a user to quickly and easily carry on an operation of an electronic device.

Figure 12:
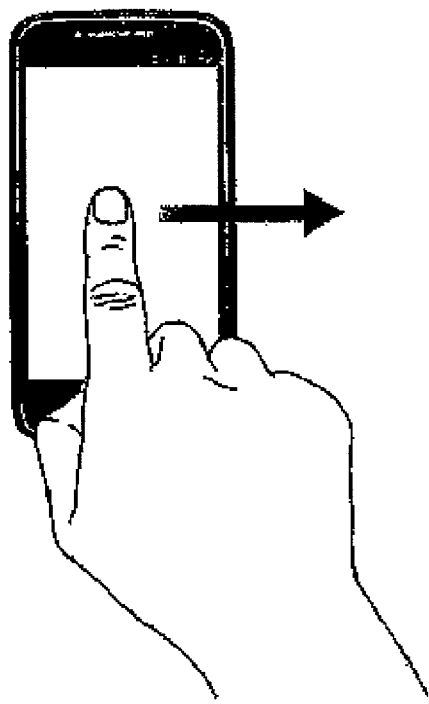
Figure 12:
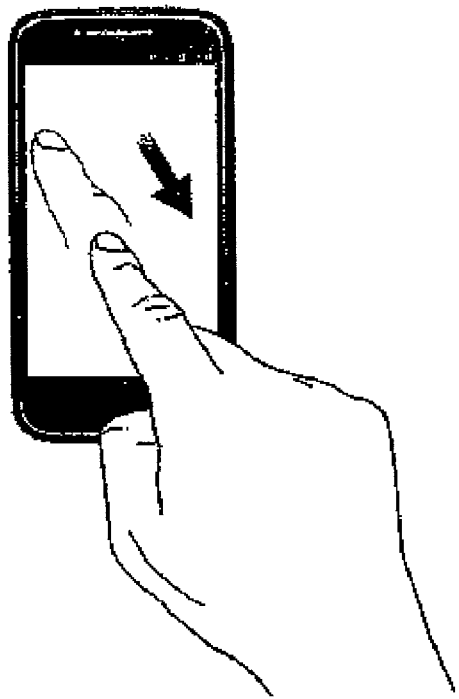

(a) of FIG. 12 is a view for explanation of a flick operation. (b) of FIG. 12 is a view for explanation of a drag operation.

Figure 13:
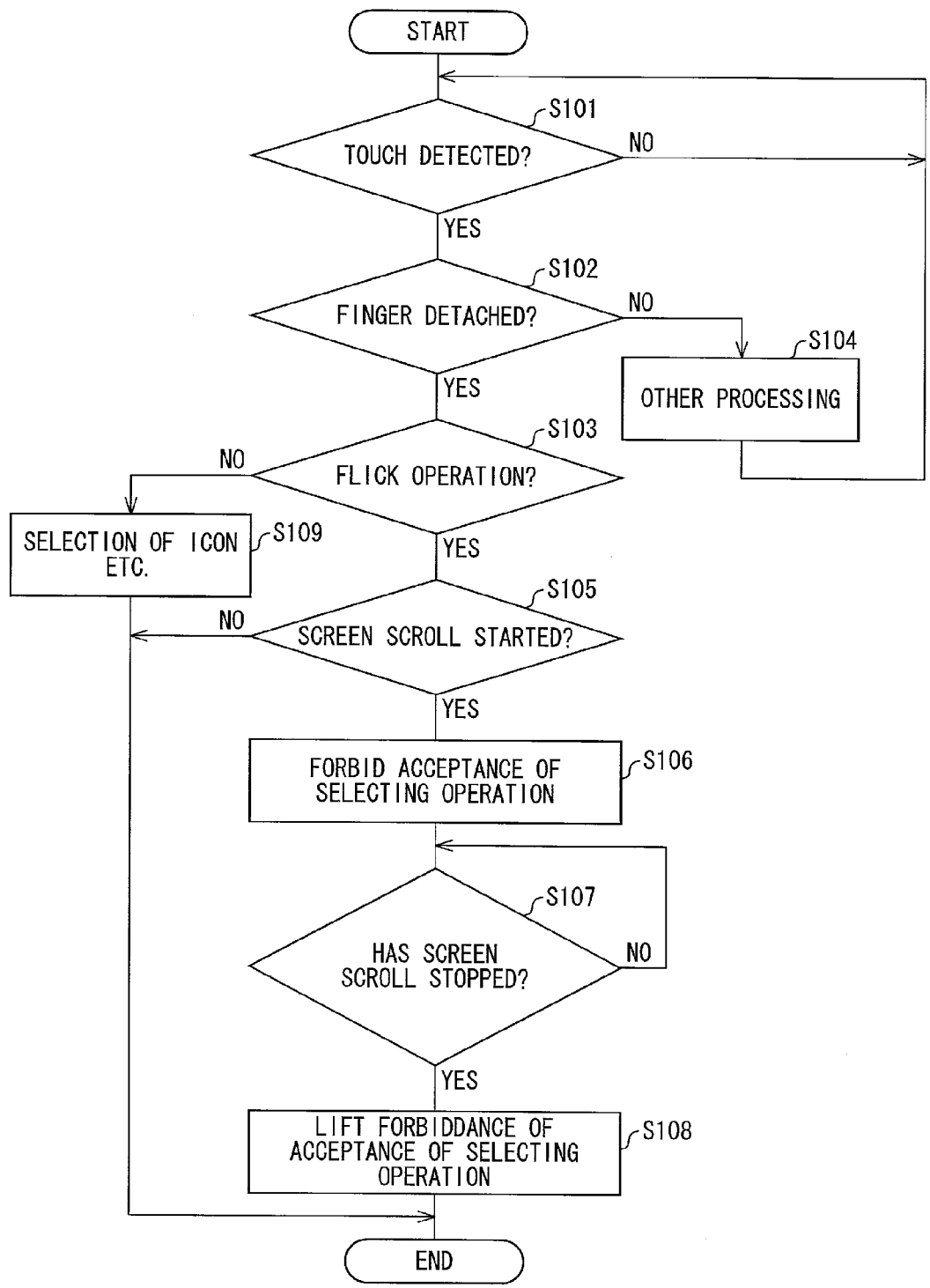

FIG. 13 is a flowchart illustrating how the conventional mobile phone carries out touch control.

DESCRIPTION OF EMBODIMENTS

[Embodiment 1]

The following description will discuss Embodiment 1 of the present invention with reference to FIGS. 1 through 4.

(Configuration of Mobile Phone)

Figure 1:
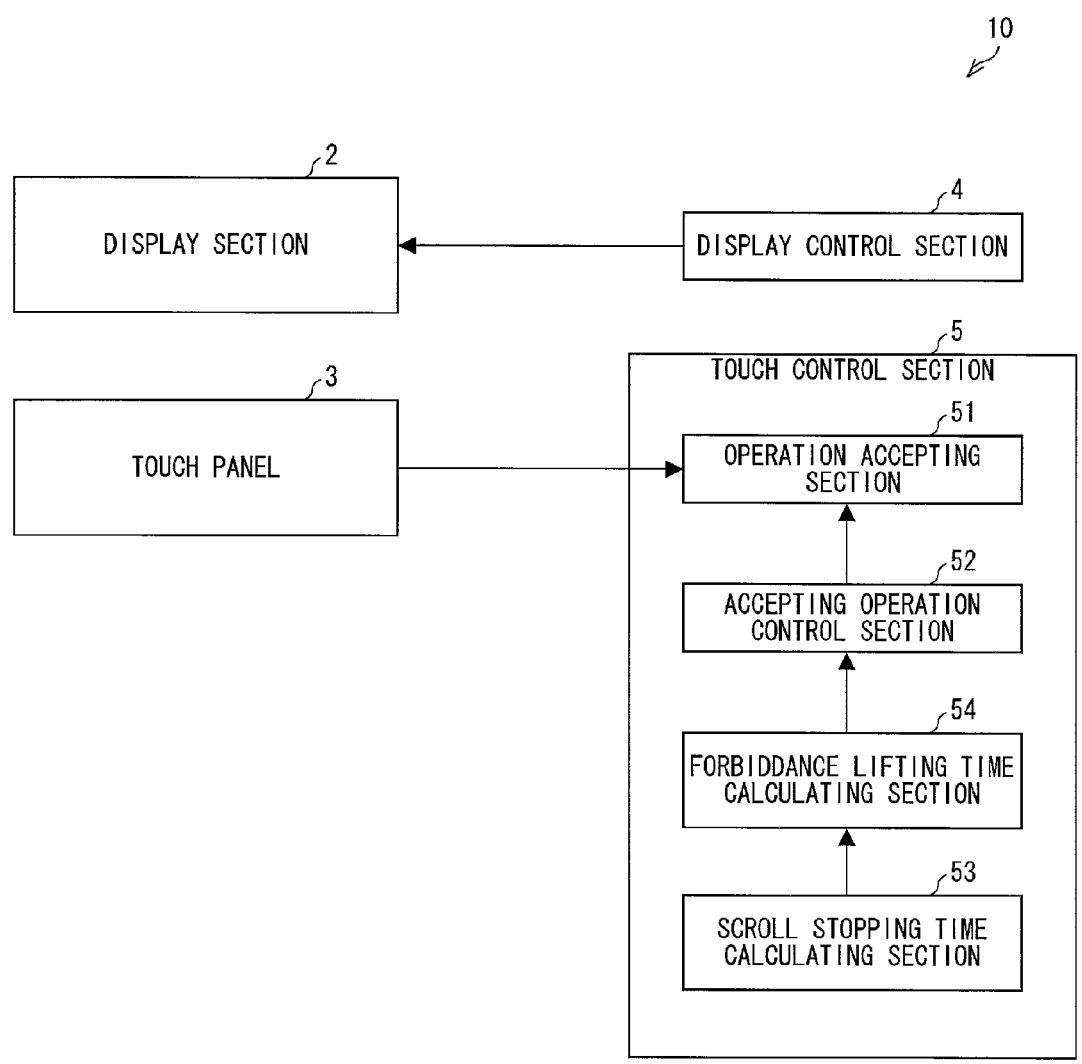
FIG. 1 is a block diagram illustrating, in more detail, a configuration of a mobile phone illustrated in FIG. 2.
Figure 2:
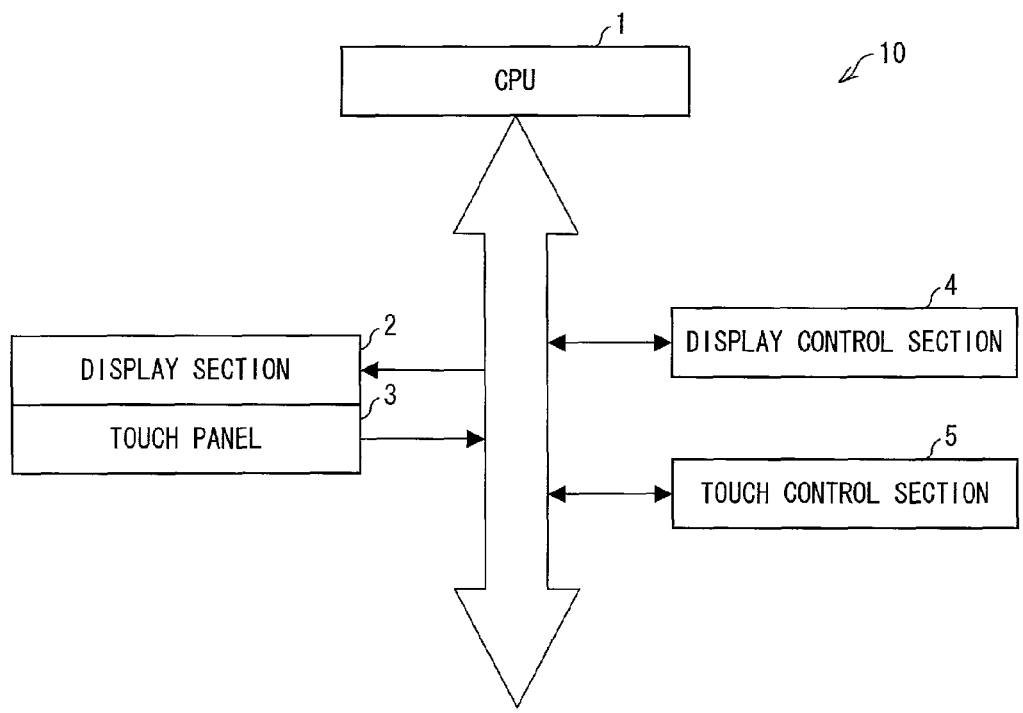
FIG. 2 is a block diagram schematically illustrating the configuration of the mobile phone in accordance with Embodiment 1 of the present invention.

FIG. 2 is a block diagram schematically illustrating a configuration of a mobile phone 10 in accordance with Embodiment 1. FIG. 1 is a block diagram illustrating, in more detail, the configuration of the mobile phone 10.

The mobile phone 10 includes a CPU 1, a display section 2, a touch panel 3, a display control section 4, and a touch control section 5.

A flat display is employed as the display section 2 so as to reduce a thickness of the mobile phone 10. Examples of the flat display encompass a liquid crystal display, an EL display, and a plasma display. Note that the display section 2 corresponds to a display device recited in Claims.

The touch panel 3 is an input device via which a user conducts a touch operation on a display screen of the display section 2. In a case where a touch operation is conducted with respect to the touch panel 3, the touch panel 3 supplies, to the touch control section 5, a signal in accordance with a touched position.

The display control section 4 controls, in accordance with an instruction issued by the CPU 1, the display section 2 to, for example, scroll a displayed screen (hereinafter, simply referred to as "carry out a screen scroll") or switch one screen to another.

(Configuration of Touch Control Section)

The touch control section 5 is an input control device which processes a signal received from the touch panel 3 and then controls an acceptance of an operation conducted via the touch panel 3. The touch control section 5 includes an operation accepting section 51, an accepting operation control section 52, a scroll stopping time calculating section 53, and a forbiddance lifting time calculating section 54.

The operation accepting section 51 determines, in accordance with a signal received from the touch panel 3, a content of an input operation conducted with respect to the touch panel 3, and then supplies, to a CPU (not illustrated), information in accordance with the content of the input operation.

The accepting operation control section 52 controls the operation accepting section 51 to forbid/permit an accepting operation. Particularly, out of accepting operations conducted by the operation accepting section 51, the accepting operation control section 52 controls the operation accepting section 51 to forbid or permit an acceptance of a selecting operation conducted with respect to a display element, such as an icon, on a screen displayed by the display section 2 (hereinafter simply referred to as "selecting operation").

Figure 11:
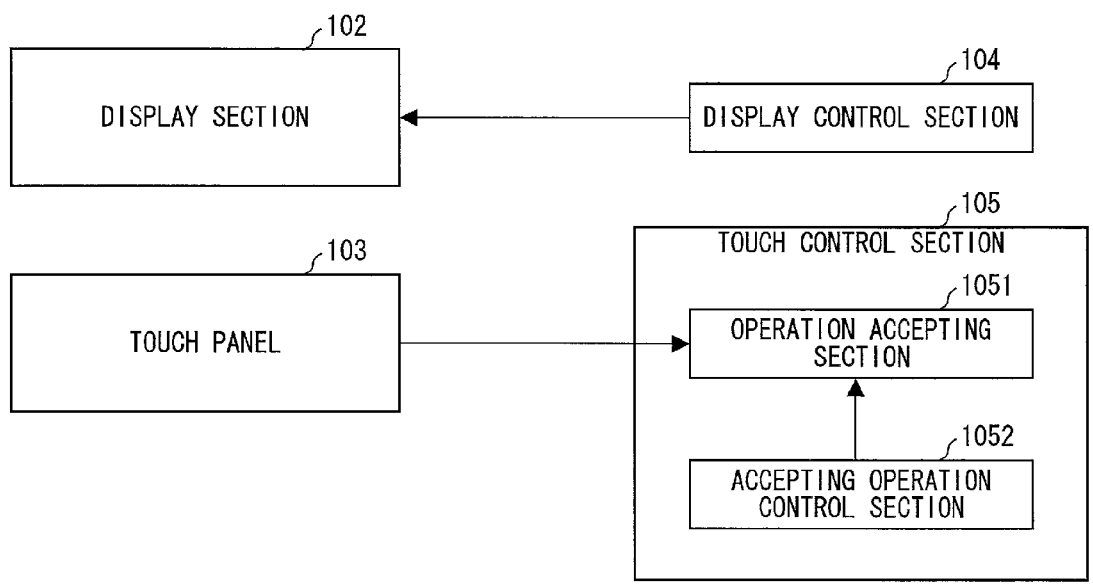
FIG. 11 is a block diagram illustrating a configuration of a conventional mobile phone.

As with the accepting operation control section 1052 of the conventional mobile phone 100 illustrated in FIG. 11, the accepting operation control section 52 controls the operation accepting section 51 to forbid (disable) an acceptance of a selecting operation, in a case where scrolling of a screen displayed by the display section 2 is started.

(Timing at which Forbiddance of Selecting Operation is Lifted)

The scroll stopping time calculating section 53 and the forbiddance lifting time calculating section 54 are respective new functional blocks which are not provided in the conventional mobile phone 100. With the use of the functional blocks, the accepting operation control section 52 controls the operation accepting section 51 to lift the forbiddance of an accepting operation before screen scroll automatically stops. According to Embodiment 1, in a case where screen scroll is started in response to a flick operation, the accepting operation control section 52 controls the operation accepting section 51 to lift the forbiddance of an accepting operation a predetermined time (for example, two seconds) before the screen scroll automatically stops. Note that "screen scroll automatically stops" means "screen scroll stops without recourse to operation of a user".

Figure 3:
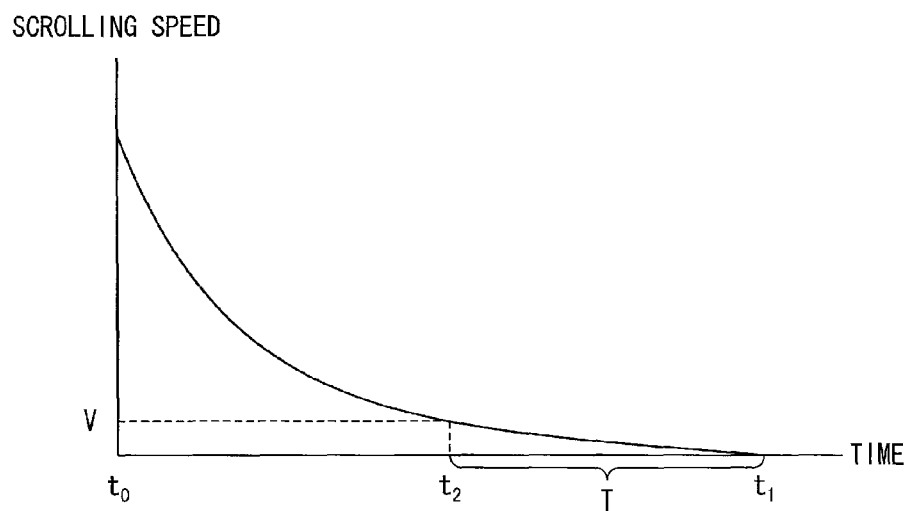
FIG. 3 is a graph for explanation of a timing when the mobile phone illustrated in FIG. 1 lifts forbiddance of a selecting operation.

Specifically, in a case where screen scroll is started at a time $t_0$, the scroll stopping time calculating section 53 calculates a time $t_1$ at which the screen scroll automatically stops, in accordance with (i) a scrolling speed (the number of dots by which a screen moves per unit of time) and (ii) a deceleration rate of the scrolling speed (see FIG. 3). Information indicative of the time $t_1$ calculated by the scroll stopping time calculating section 53 is supplied to the forbiddance lifting time calculating section 54.

The forbiddance lifting time calculating section 54 calculates a time $t_2$ which is obtained by subtracting a predetermined time period T from the time $t_1$ calculated by the scroll stopping time calculating section 53. Thereafter, at the time $t_2$, the forbiddance lifting time calculating section 54 supplies, to the accepting operation control section 52, a signal causing the accepting operation control section 52 to control the operation accepting section 51 to lift the forbiddance of an accepting operation. Note that the predetermined time period T is set to such a degree that a scrolling speed V causes a user not to conduct an erroneous operation. The scrolling speed V is a scrolling speed at a time when time, remaining until the screen scroll stops, is equal to the predetermined time period T.

This allows the user to conduct a selecting operation at a timing when the scrolling speed decreases to such a degree that causes the user not to conduct an erroneous operation, even before the screen scroll stops. During the predetermined time period before the screen scroll stops, it is possible for the user to conduct a selecting operation, as with a case of conducting a normal operation (an operation of stopping the screen scroll), regardless of a time period during which a finger(s) or the like touches on a screen. It follows that the user does not need to consciously use a selection operation in distinction from an operation of stopping screen scroll and vice versa, unlike Patent Literature 1. Moreover, it is possible to surely avoid an erroneous operation because a selecting operation is disabled during the screen scroll at high speed, as with the mobile phone 100. This allows the user to quickly and easily carry on an operation of the mobile phone 10, even in a case where screen scroll is required.

(Procedure of Input Control)

Figure 4:
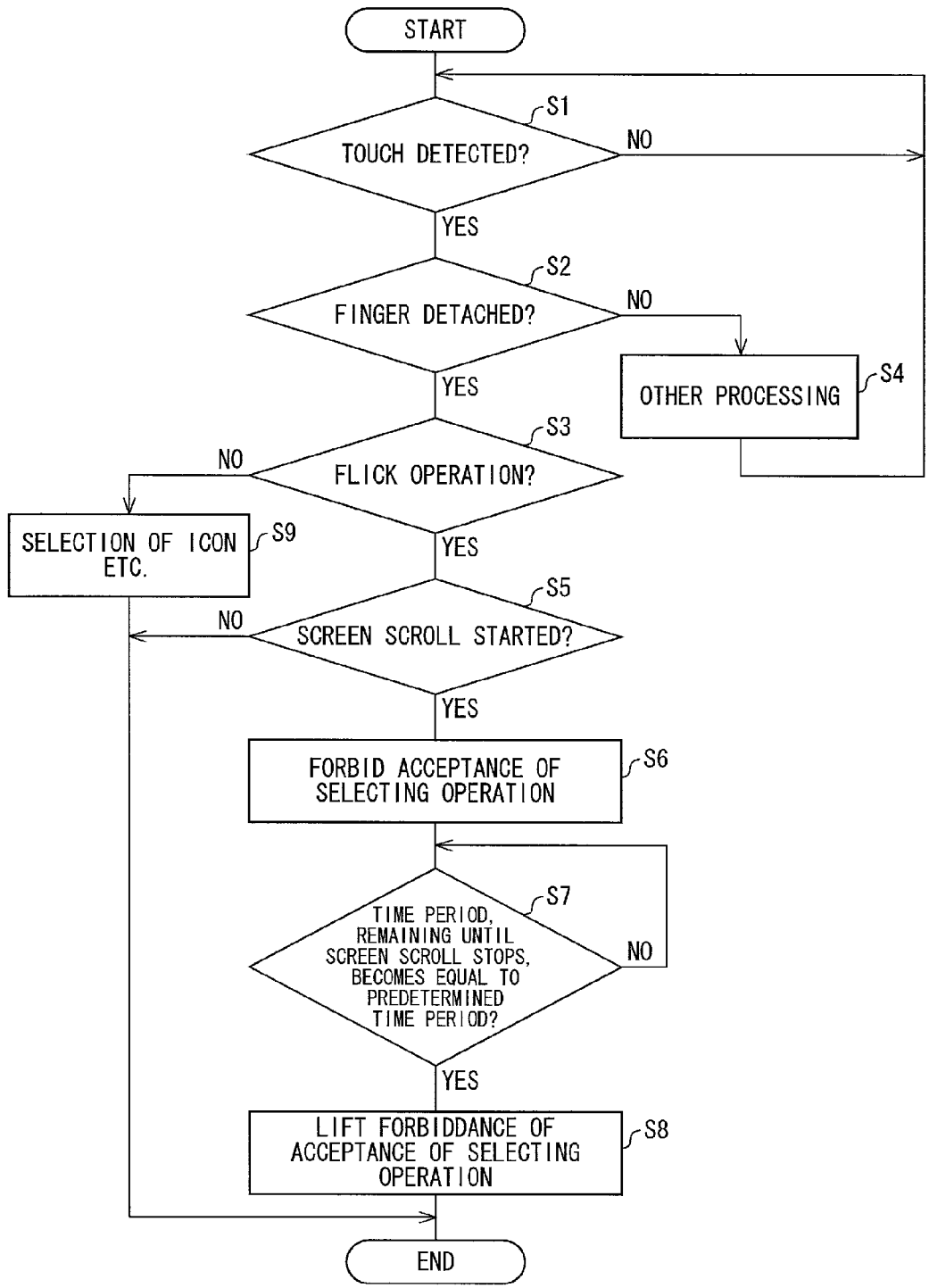
FIG. 4 is a flowchart illustrating how the mobile phone illustrated in FIG. 1 carries out touch control.

FIG. 4 is a flowchart illustrating how the mobile phone 10 carries out touch control. In a case where (i) a touch operation with respect to the touch panel 3 is detected (Yes, in step S1, operation accepting step) and (ii) a finger(s) is detached from the touch panel 3 (Yes, in step S2), the accepting operation control section 52 determines whether or not the touch operation is a flick operation (step S3). In a case where the finger(s) is in contact with the touch panel 3 even after a given time has elapsed (No, in step S2), processing corresponding to a drag operation or a press-and-hold operation is conducted (step S4).

In a case where (i) the touch operation is a flick operation (Yes, in step S3) and (ii) screen scroll is started (Yes, in step S5), the accepting operation control section 52 controls the operation accepting section 51 to forbid an acceptance of a selecting operation (step S6, accepting operation forbidding step). At the same time, the scroll stopping time calculating section 53 calculates a time $t_1$ at which the screen scroll automatically stops, and then the forbiddance lifting time calculating section 54 calculates a time $t_2$ which is obtained by subtracting a predetermined time period T from the time $t_1$. Thereafter, at the time $t_2$, the forbiddance lifting time calculating section 54 supplies, to the accepting operation control section 52, a signal causing the accepting operation control section 52 to control the operation accepting section 51 to lift the forbiddance of an accepting operation. Thus, in a case where a time period, remaining until the screen scroll stops, becomes equal to the predetermined time period (Yes, in step S7), the accepting operation control section 52 controls the operation accepting section 51 to lift the forbiddance of an acceptance of a selecting operation (step S8, forbiddance lifting step).

Note that, in a case where the touch operation is an operation (for example, a tap operation with respect to an icon) other than the flick operation in step S3, a selection of the icon is, for example, made (step S9). In a case where the touch operation is a flick operation but screen scroll is not started because, for example, the finger(s) is moved in a direction in which a screen cannot be scrolled (No, in step S5), the accepting operation control section 52 controls the operation accepting section 51 not to forbid an acceptance of a selecting operation with respect to an icon or the like.

Note that, even while an acceptance of a selecting operation is being forbidden during the screen scroll, it is possible to conduct (i) a flick operation by which the screen scroll is continued or (ii) a tap operation by which the screen scroll is stopped.

(Summary)

As has been described, according to Embodiment 1, in a case where screen scroll is started in response to a flick operation, forbiddance of an acceptance of a selecting operation is lifted a predetermined time before the screen scroll automatically stops. Therefore, it is possible for a user to conduct a selecting operation at a timing when a scrolling speed decreases to such a degree that causes the user not to conduct an erroneous operation, even before the screen scroll stops. This allows the user to quickly and easily carry on an operation of the mobile phone 10.

[Embodiment 2]

Figure 5:
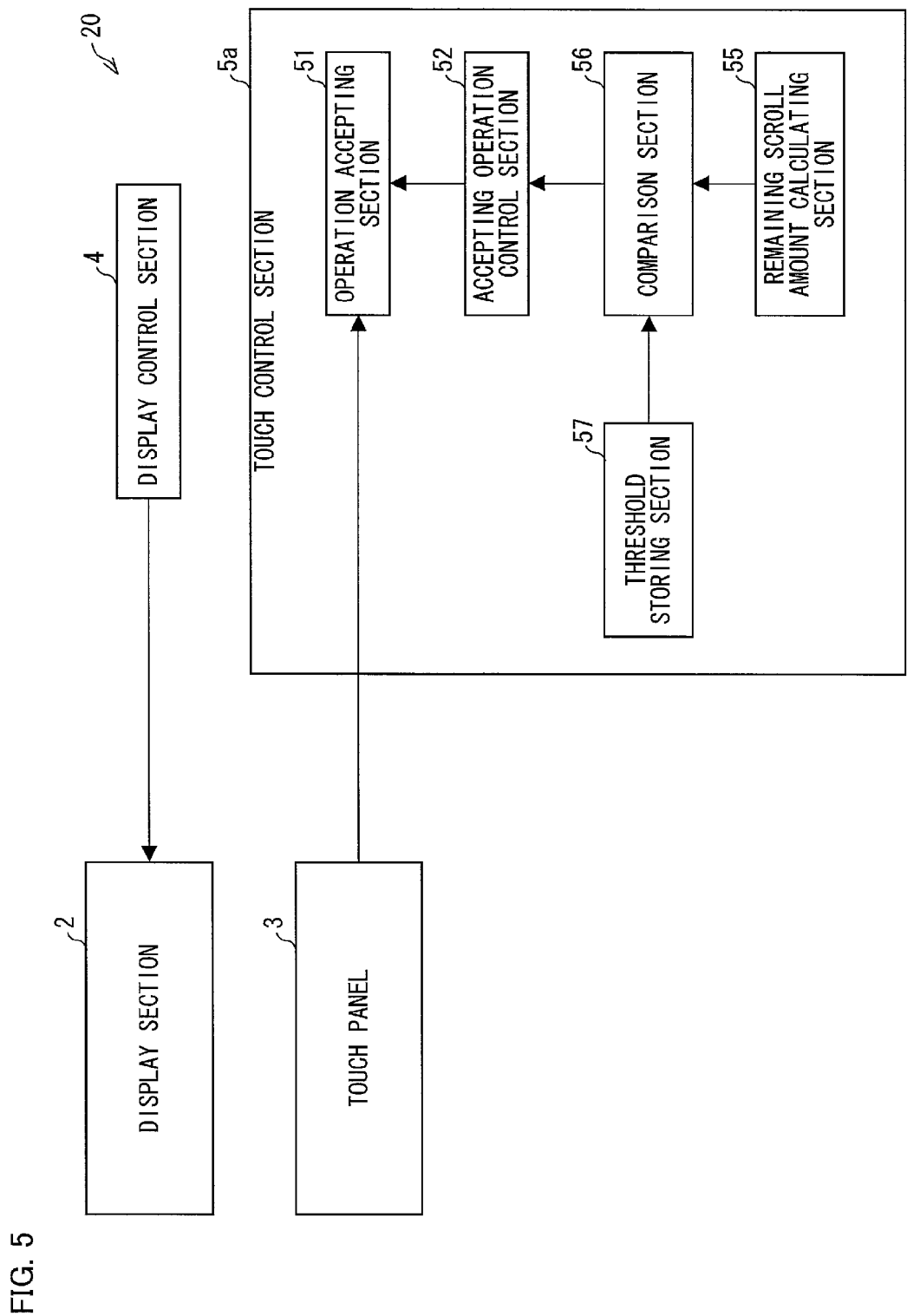
FIG. 5 is a block diagram illustrating a configuration of a mobile phone in accordance with Embodiment 2 of the present invention.
Figure 6:
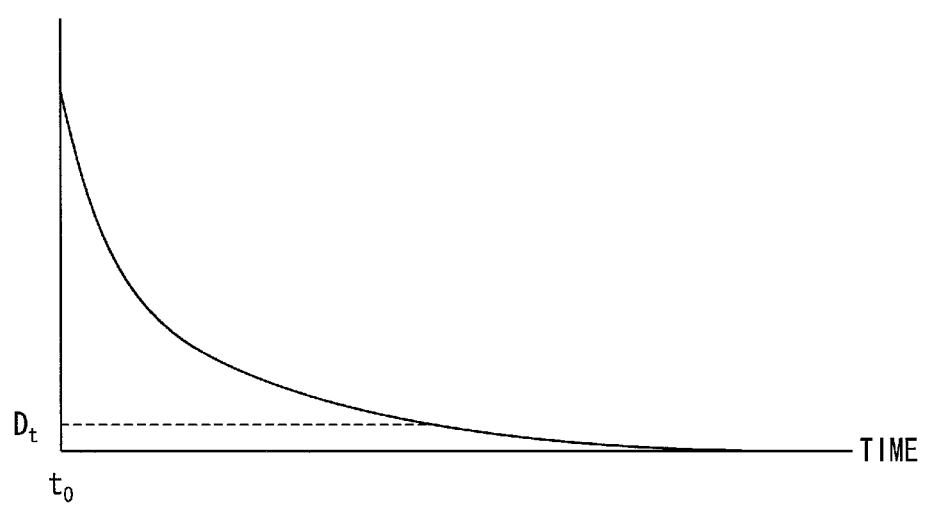
FIG. 6 is a graph for explanation of a timing when the mobile phone illustrated in FIG. 5 lifts forbiddance of a selecting operation.
Figure 7:
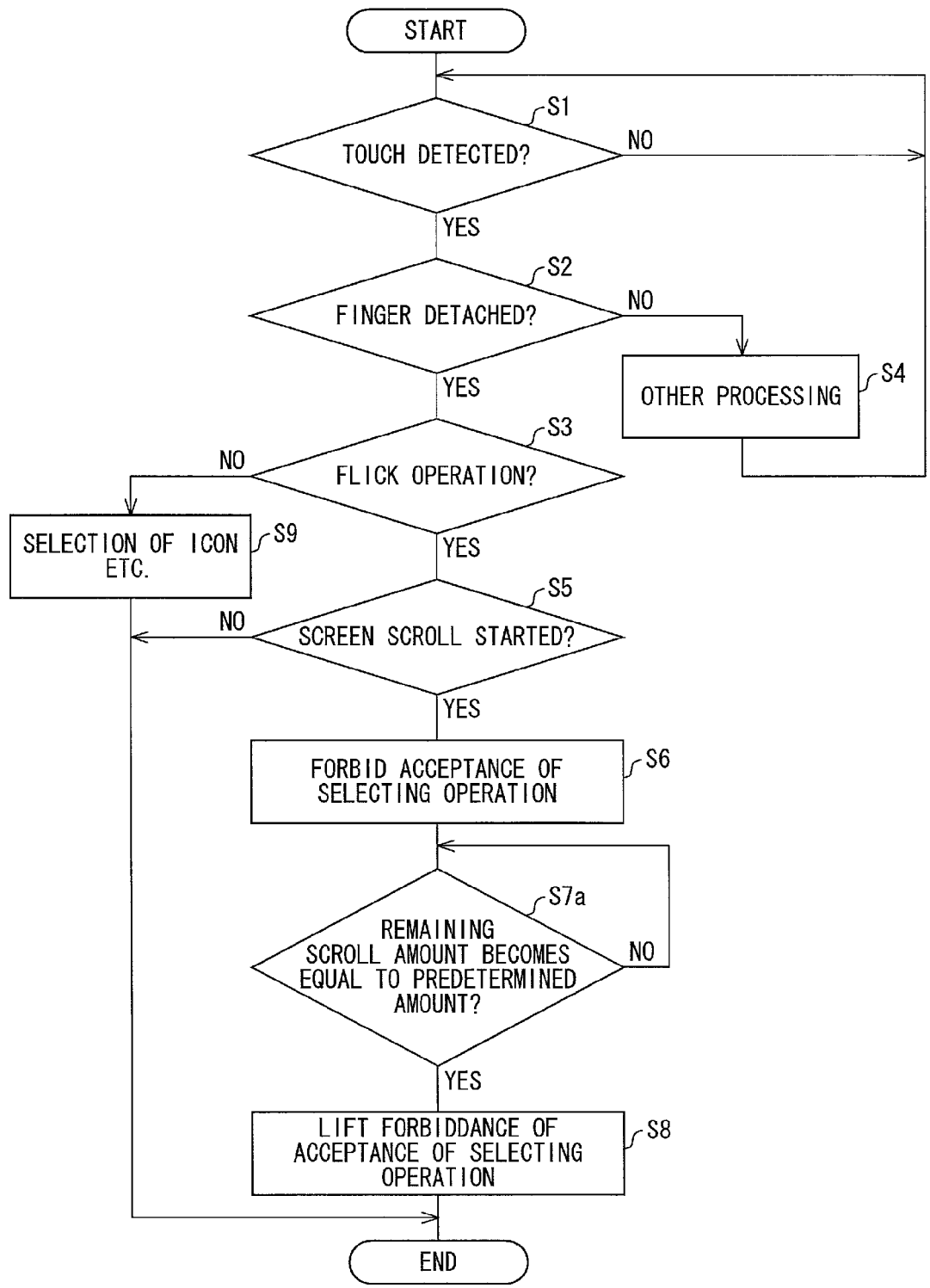
FIG. 7 is a flowchart illustrating how the mobile phone illustrated in FIG. 5 carries out touch control.

The following description will discuss Embodiment 2 of the present invention with reference to FIGS. 5 through 7. Embodiment 1 has discussed a configuration in which forbiddance of a selecting operation is lifted a predetermined time before screen scroll automatically stops. In contrast, Embodiment 2 will discuss a configuration in which forbiddance of a selecting operation is lifted in a case where a scroll amount, remaining until screen scroll automatically stops, becomes equal to a predetermined amount. Note that, for convenience, identical reference numbers are given to members having functions identical to those described in Embodiment 1 and no description of the members will be provided here.

(Configuration of Touch Control Section)

FIG. 5 is a block diagram illustrating a configuration of a mobile phone 20 in accordance with Embodiment 2. The mobile phone 20 includes a CPU (not illustrated), a display section 2, a touch panel 3, a display control section 4, and a touch control section 5a. The mobile phone 20 is different from the mobile phone 10 of Embodiment 1 in that the touch control section 5a is provided instead of the touch control section 5.

The touch control section 5a processes a signal received from the touch panel 3. The touch control section 5a includes an operation accepting section 51, an accepting operation control section 52, a remaining scroll amount calculating section 55, a comparison section 56, and a threshold storing section 57. The touch control section 5a is thus different from the touch control section 5 of Embodiment 1 in that the remaining scroll amount calculating section 55, the comparison section 56, and the threshold storing section 57 are provided instead of the scroll stopping time calculating section 53 and the forbiddance lifting time calculating section 54.

(Timing at which Forbiddance of Selecting Operation is Lifted)

The remaining scroll amount calculating section 55, the comparison section 56, and the threshold storing section 57 are respective new functional blocks which are not provided in the conventional mobile phone 100. With the use of the functional blocks, the accepting operation control section 52 controls the operation accepting section 51 to lift forbiddance of an accepting operation, in a case where (i) screen scroll is started in response to a flick operation and then (ii) a scroll amount, remaining until the screen scroll automatically stops, becomes equal to a predetermined amount (for example, an amount equivalent to one icon).

Specifically, in a case where screen scroll is started at a time $t_0$, the remaining scroll amount calculating section 55 continuously calculates a scroll amount remaining until the screen scroll automatically stops (remaining scroll amount), in accordance with (i) a scrolling speed (the number of dots by which a screen moves per unit of time) and (ii) a deceleration rate of the scrolling speed (see FIG. 6). The scroll stopping time calculating section 53 then supplies the remaining scroll amount thus calculated to the comparison section 56.

The threshold storing section 57 stores a threshold Dt indicative of, for example, the number of dots corresponding to one (1) icon (several pixels). The comparison section 56 compares the threshold Dt with the remaining scroll amount received from the scroll stopping time calculating section 53. In a case where the remaining scroll amount becomes equal to the threshold Dt, the comparison section 56 supplies, to the accepting operation control section 52, a signal causing the accepting operation control section 52 to control the operation accepting section 51 to lift the forbiddance of an accepting operation. Note that the threshold Dt is not limited to the number of dots corresponding to one (1) icon. The threshold Dt is set to such a degree that a scrolling speed, at a time when a remaining scroll amount becomes equal to the threshold Dt, causes a user not to conduct an erroneous operation.

This allows the user to conduct a selecting operation at a timing when the scrolling speed decreases to such a degree that causes the user not to conduct an erroneous operation, even before the screen scroll stops. Therefore, even in a case where screen scroll is required, it is possible for the user to quickly and easily carry on an operation of the mobile phone 20.

(Procedure of Input Control)

FIG. 7 is a flowchart illustrating how the mobile phone 20 carries out touch control. Steps S1 through S6, S8, and S9 illustrated in FIG. 7 are identical to the steps S1 through S6, S8, and S9, respectively, illustrated in FIG. 4. The flowchart illustrated in FIG. 7 is different from the flowchart illustrated in FIG. 4 in that a step S7a is included instead of the step S7.

Specifically, in a case where screen scroll is started in response to a flick operation (Yes, in the step S5), the accepting operation control section 52 controls the operation accepting section 51 to forbid an acceptance of a selecting operation (step S6, accepting operation forbidding step). The remaining scroll amount calculating section 55 calculates a scroll amount remaining until the screen scroll automatically stops, and then supplies the remaining scroll amount thus calculated to the comparison section 56. In a case where the remaining scroll amount is equal to a threshold Dt stored in the threshold storing section 57, the comparison section 56 supplies, to the accepting operation control section 52, a signal causing the accepting operation control section 52 to control the operation accepting section 51 to lift the forbiddance of an accepting operation. Thus, in a case where the remaining scroll amount becomes equal to the predetermined amount (yes, in the step S7a), the accepting operation control section 52 controls the operation accepting section 51 to lift the forbiddance of an acceptance of a selecting operation (step S8, forbiddance lifting step).

(Summary)

As has been described, according to Embodiment 2, in a case where screen scroll is started in response to a flick operation, forbiddance of an acceptance of a selecting operation is lifted when a remaining scroll amount become equal to a predetermined amount. It is therefore possible for a user to conduct a selecting operation at a timing when a scrolling speed decreases to such a degree that causes the user not to conduct an erroneous operation, even before the screen scroll stops. This allows the user to quickly and easily carry on an operation of the mobile phone 20.

[Embodiment 3]

Figure 8:
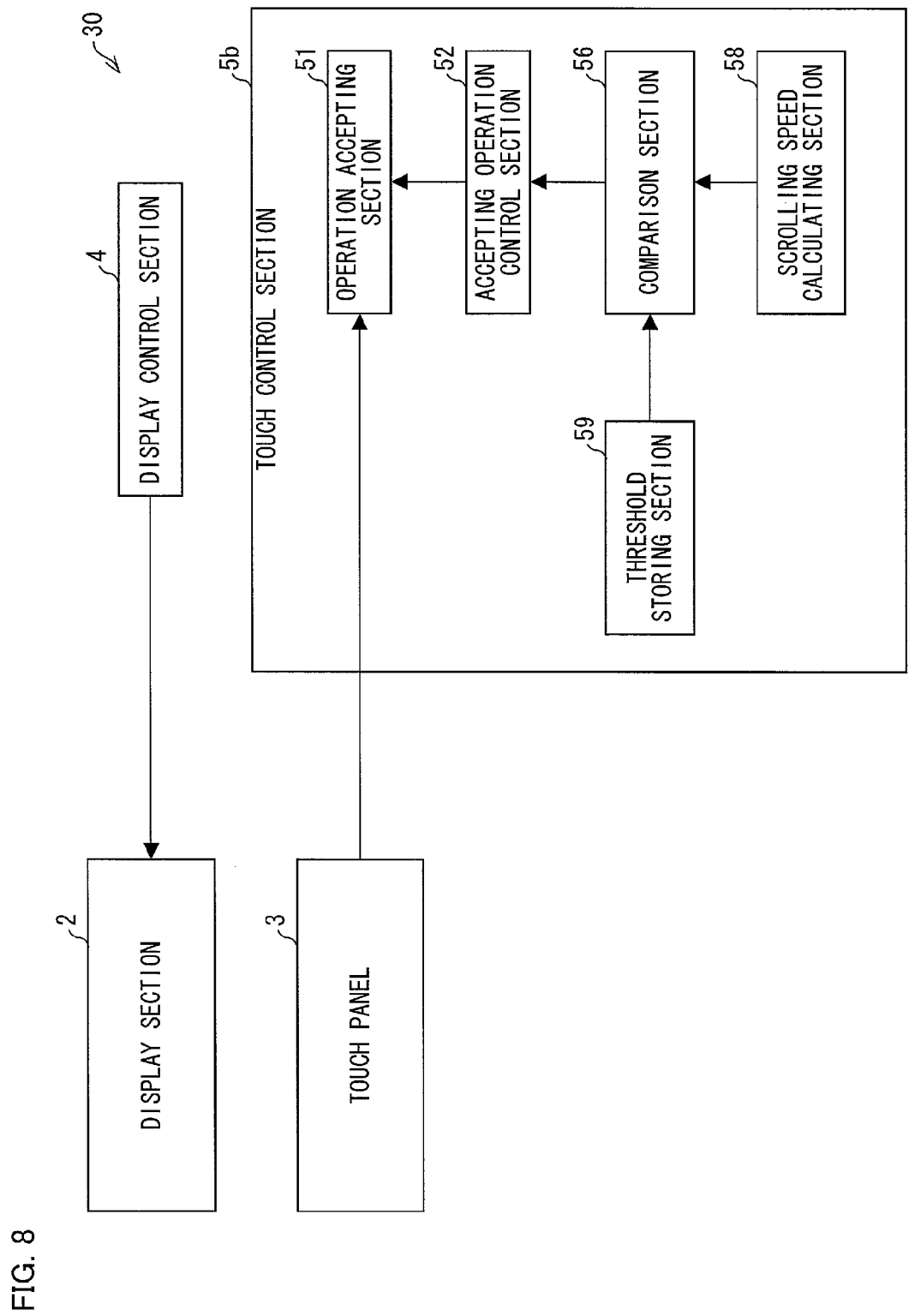
FIG. 8 is a block diagram illustrating a configuration of a mobile phone in accordance with Embodiment 3 of the present invention.
Figure 9:
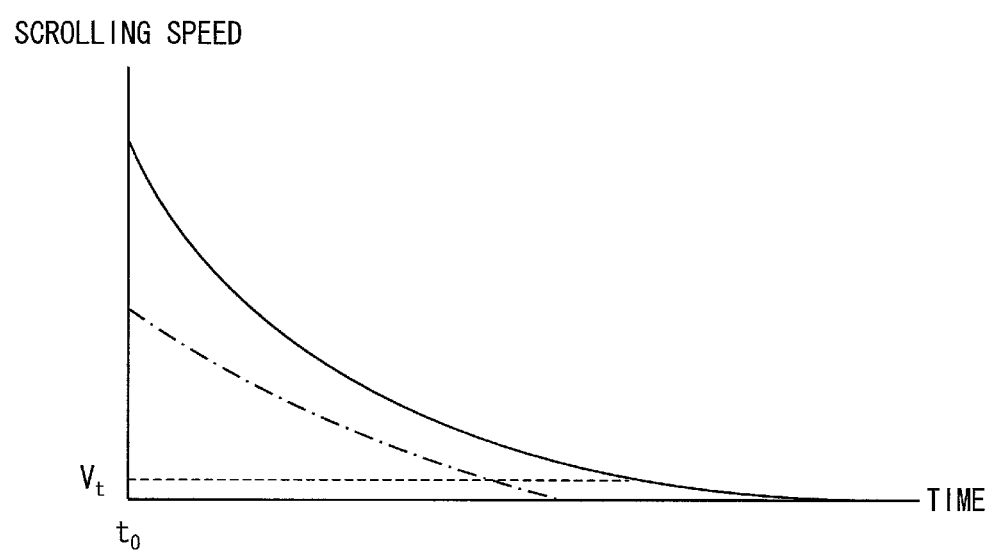
FIG. 9 is a graph for explanation of a timing when the mobile phone illustrated in FIG. 8 lifts forbiddance of a selecting operation.
Figure 10:
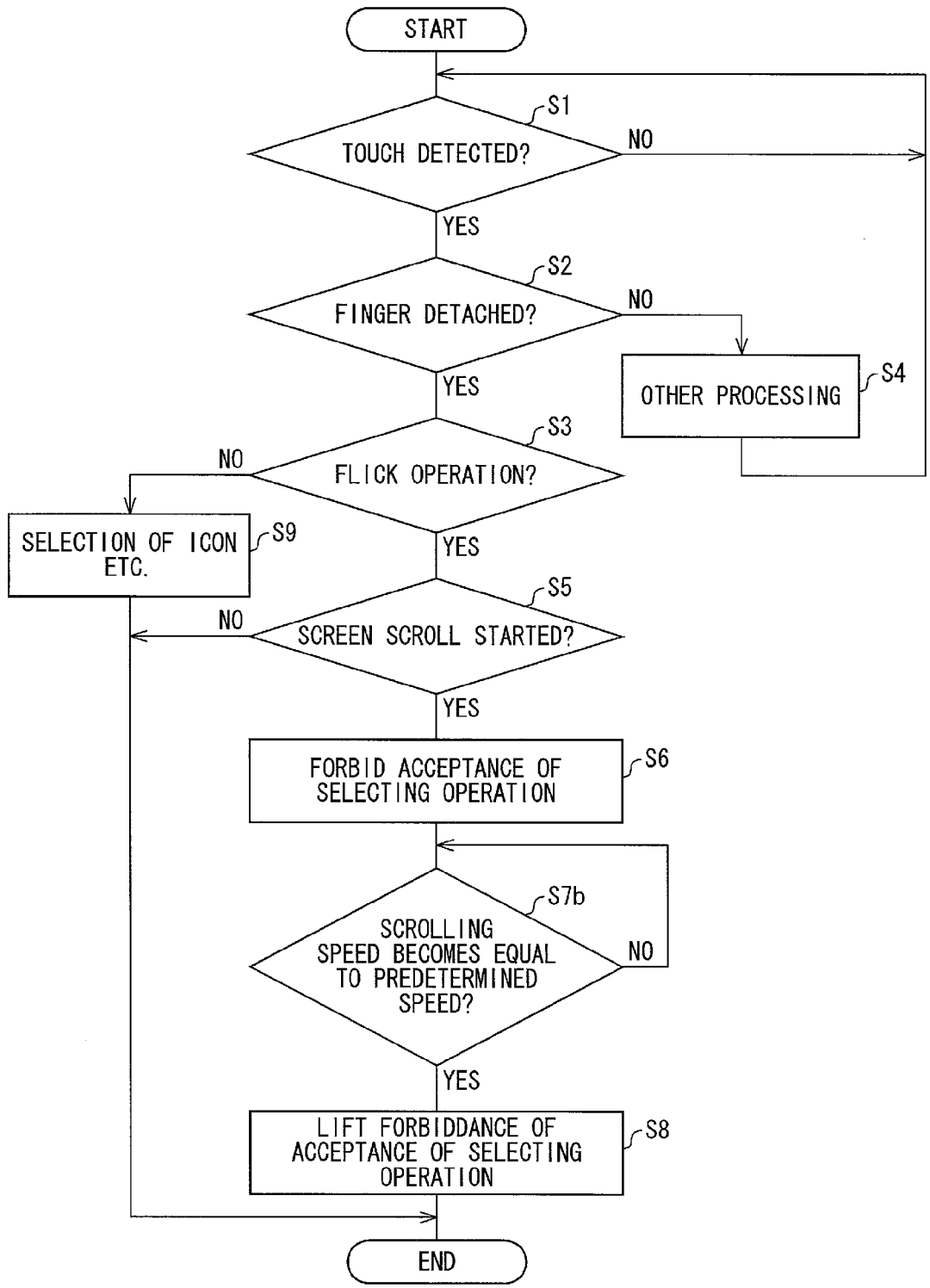
FIG. 10 is a flowchart illustrating how the mobile phone illustrated in FIG. 8 carries out touch control.

The following description will discuss Embodiment 3 of the present invention with reference to FIGS. 8 through 10. Embodiment 3 will discuss a configuration in which forbiddance of a selecting operation is lifted in a case where a speed of screen scroll automatically decreases and reaches a predetermined speed. Note that, for convenience, identical reference numbers are given to members having functions identical to those described in Embodiments 1 and 2 and no description of the members will be provided here.

(Configuration of Touch Control Section)

FIG. 8 is a block diagram illustrating a configuration of a mobile phone 30 in accordance with Embodiment 3. The mobile phone 20 includes a CPU (not illustrated), a display section 2, a touch panel 3, a display control section 4, and a touch control section 5b. The mobile phone 30 is different from the mobile phone 10 of Embodiment 1 in that the touch control section 5b is provided instead of the touch control section 5.

The touch control section 5b processes a signal received from the touch panel 3. The touch control section 5b includes an operation accepting section 51, an accepting operation control section 52, a comparison section 56, a scrolling speed calculating section 58, and a threshold storing section 59. The touch control section 5b is thus different from the touch control section 5a of Embodiment 2 in that the scrolling speed calculating section 58 and the threshold storing section 59 are provided instead of the remaining scroll amount calculating section 55 and the threshold storing section 57.

(Timing at which Forbiddance of Selecting Operation is Lifted)

The comparison section 56, the scrolling speed calculating section 58, and the threshold storing section 59 are respective new functional blocks which are not provided in the conventional mobile phone 100. With the use of the functional blocks, the accepting operation control section 52 controls the operation accepting section 51 to lift forbiddance of an accepting operation, in a case where (i) screen scroll is started in response to a flick operation and then (ii) a speed of the screen scroll automatically decreases and reaches a predetermined speed.

Specifically, in a case where screen scroll is started at a time $t_0$, the scrolling speed calculating section 58 continuously calculates a scrolling speed (the number of dots by which a screen moves per unit of time) (see FIG. 9). The scrolling speed calculated by the scrolling speed calculating section 58 is supplied to the comparison section 56.

The threshold storing section 59 stores a threshold Vt indicative of such a degree of a scrolling speed that causes a user not to conduct an erroneous operation. The comparison section 56 compares the threshold Vt with the scrolling speed received from the scrolling speed calculating section 58. In a case where the scrolling speed becomes equal to the threshold Vt, the comparison section 56 supplies, to the accepting operation control section 52, a signal causing the accepting operation control section 52 to control the operation accepting section 51 to lift the forbiddance of an accepting operation.

This allows the user to conduct a selecting operation at a timing when the scrolling speed decreases to such a degree that causes the user not to conduct an erroneous operation, even before the screen scroll stops. Therefore, even in a case where screen scroll is required, it is possible for the user to quickly and easily carry on an operation of the mobile phone 30.

According to Embodiment 3, it is further possible not to change a scrolling speed at a time when forbiddance of a selecting operation is lifted, even in a case where a change in subsequent scrolling speed varies depending on a scrolling speed at a time when scrolling is started (see a solid line and a dashed-dotted line illustrated in FIG. 9.

(Procedure of Input Control)

FIG. 10 is a flowchart illustrating how the mobile phone 30 carries out touch control. Steps S1 through S6, S8 and S9 illustrated in FIG. 10 are identical to the steps S1 through S6, S8, and S9, respectively, illustrated in FIG. 4. The flowchart illustrated in FIG. 10 is different from the flowchart illustrated in FIG. 4 in that a step S7b is included instead of the step S7.

Specifically, in a case where screen scroll is started in response to a flick operation (yes, in the step S5), the accepting operation control section 52 controls the operation accepting section 51 to forbid an acceptance of a selecting operation (step S6, accepting operation forbidding step). The scrolling speed calculating section 58 calculates a scrolling speed of the screen, and then supplies the scrolling speed to the comparison section 56. In a case where the scrolling speed becomes equal to a threshold Vt stored in the threshold storing section 59, the comparison section 56 supplies, to the accepting operation control section 52, a signal causing the accepting operation control section 52 to control the operation accepting section 51 to lift the forbiddance of an accepting operation. Thus, in a case where the scrolling speed becomes equal to the predetermined speed (yes, in the step S7b), the accepting operation control section 52 controls the operation accepting section 51 to lift the forbiddance of an acceptance of a selecting operation (step S8, forbiddance lifting step).

Note that, in a case where a speed of screen scroll during a drag operation becomes equal to the predetermined speed, forbiddance of an acceptance of a selecting operation is not lifted.

(Summary)

As has been described, according to Embodiment 3, in a case where screen scroll is started in response to a flick operation, forbiddance of an acceptance of a selecting operation is lifted when a speed of the screen scroll automatically decreases and reaches a predetermined speed. It is therefore possible for a user to conduct a selecting operation at a timing when the scrolling speed decreases to such a degree that causes the user not to conduct an erroneous operation, even before the screen scroll stops. This allows the user to quickly and easily carry on an operation of the mobile phone 30.

Software Implementation Example

Each block of the mobile phones 10, 20, and 30 (particularly, the display control section 4 and the touch control sections 5, 5a, and 5b) can be implemented by hardware such as a logic circuit provided on an integrated circuit (IC chip) or can alternatively be implemented by software with the use of a CPU (Central Processing Unit).

In the latter case, each of the mobile phones 10, 20, and 30 includes: a CPU that executes instructions of a program that carries out the foregoing functions; and a storage device (recording medium) such as a ROM (Read Only Memory) that stores the program, a RAM (Random Access Memory) in which the program is loaded, and a memory that stores the program and various sets of data. The object of the present invention can be attained by (i) supplying, to each of the mobile phones 10, 20, and 30, the recoding medium in which program codes (an executable program, an intermediate code program, and a source program) of a program for controlling the mobile phones 10, 20, and 30, each of which is implemented by software that executes the foregoing functions, are computer-readably recorded and (ii) causing a computer (or a CPU or an MPU) of the each of the mobile phones 10, 20, and 30 to read and execute the program codes recorded in the recording medium.

Examples of the recording medium includes: (i) tapes such as a magnetic tape and a cassette tape; (ii) disks including magnetic disks, such as a Floppy (Registered Trademark) disk and a hard disk, and optical disks, such as a CD-ROM, an MO, an MD, a DVD, and a CD-R; (iii) cards such as an IC card (including a memory card) and an optical card; (iv) semiconductor memories such as a mask ROM, EPROM, EEPROM (Registered Trademark), and a flash ROM; and (v) logic circuits such as a PLD (Programmable Logic Device) and an FPGA (Field Programmable Gate Array).

Each of the mobile phones 10, 20 and 30 can be connected to a communication network so that the program codes are supplied to the each of the mobile phones 10, 20, and 30 via the communication network. This communication network is not limited to any particular one, provided that the program codes can be transmitted. Examples of the communication network include the Internet, an intranet, an extranet, a LAN, ISDN, VAN, a CATV communications network, a virtual private network, a telephone network, a mobile telecommunications network, and a satellite communication network. Further, a transmission medium by which the communication network is constituted is not limited to any particular one, provided that the program codes can be transmitted. Examples of the transmission medium include: wired transmission media such as IEEE1394, a USB, a power-line carrier, a cable TV circuit, a telephone line, and ADSL (Asymmetric Digital Subscriber Line); and wireless transmission media such as infrared communication systems such as IrDA and a remote control, Bluetooth (Registered Trademark), IEEE802.11 wireless communication system, HDR (High Digital Rate), NFC (Near Field Communication), DLNA (Digital Living Network Alliance), a mobile phone network, a satellite circuit, and a digital terrestrial network.

[Overview of Embodiments]

According to each of the foregoing Embodiments, "screen scroll in response to a flick operation" means screen scroll in which a screen moves while following the movement of a finger(s) or the like on a touch panel and then continues to move by inertia even after the finger(s) or the like is detached from the touch panel. Examples of the "screen scroll in response to a flick operation" include a case where a screen is initially moved by a drag operation and then the screen continues to move even after a finger(s) or the like is detached from a touch panel without being stopped.

According to each of the Embodiments, a direction of screen scroll can be a right-and-left direction or an up-and-down direction with respect to an operation screen.

According to each of the foregoing Embodiments, examples of a display element to be subjected to a selecting operation include: an icon via which an application or each function of a mobile phone starts up; a character string indicative of a link; an image of an operation button; and a softkey via which a character is entered.

The present invention is not limited to the description of the embodiments, but may be altered by a skilled person in the art within the scope of the claims. An embodiment derived from a proper combination of technical means disclosed in different embodiments is also encompassed in the technical scope of the present invention.

[Points of Invention]

As has been described, an input control device in accordance with an aspect 1 of the present invention is an input control device for use in an electronic device including a display device by which a screen is displayed so as to be scrolled, on which screen a display element, to be subjected to an operation conducted via a touch panel, is displayed, the input control device controlling an acceptance of the operation, said input control device including: operation accepting means for accepting the operation to be conducted with respect to the display element; and accepting operation control means for controlling the operation accepting means to forbid an accepting operation, in a case where scrolling of the screen is started, in a case where the scrolling of the screen is started, the accepting operation control means controlling the operation accepting means to lift forbiddance of the accepting operation before the scrolling of the screen automatically stops.

Further, a method of carrying out input control in accordance with an aspect 7 of the present invention includes the steps of: accepting an operation to be conducted with respect to a display element, while a screen on which the display element, to be subjected to the operation conducted via a touch panel, is being displayed; forbidding an acceptance of the operation conducted with respect to the display element, in a case where scrolling of the screen is started; and lifting forbiddance of the acceptance of the operation before the scrolling of the screen automatically stops, in a case where the scrolling of the screen is started.

According to the above configuration, in a case where scrolling of a screen is started in response to a flick operation or the like, an operation conducted with respect to a display element via a touch panel (selecting operation) is once forbidden. The forbiddance is then lifted before the scrolling of the screen automatically stops. This allows a user to conduct a selecting operation right before the scrolling of the screen stops, that is, at a timing when a scrolling speed becomes lower, even in a state where the scrolling of the screen does not completely stops indeed. It is therefore possible to realize an input control device and a method of carrying out input control, each of which allows a user to quickly and easily carry on an operation of an electronic device.

According to an aspect 2 of the present invention, the input control device as set forth in the aspect 1 is preferably arranged such that, in a case where the scrolling of the screen is started, the accepting operation control means controls the operation accepting means to lift the forbiddance of the accepting operation a predetermined time before the scrolling of the screen automatically stops.

According to the above configuration, the predetermined time is set to such a degree that a scrolling speed causes a user not to conduct an erroneous operation. The scrolling speed is a scrolling speed at a time when time, remaining until the scrolling of the screen stops, is equal to the predetermined time. This allows the user to conduct a selecting operation at a timing when the scrolling speed decreases to such a degree that causes the user not to conduct an erroneous operation, even before the scrolling of the screen stops. It is therefore possible for the user to quickly and easily carry on an operation of an electronic device.

According to an aspect 3 of the present invention, the input control device as set forth in the aspect 1 is preferably arranged such that, in a case where the scrolling of the screen is started, the accepting operation control means controls the operation accepting means to lift the forbiddance of the accepting operation when a scroll amount, remaining until the scrolling of the screen automatically stops, becomes equal to a predetermined amount.

According to the above configuration, the predetermined amount is set to such a degree that a scrolling speed, at a time when a remaining scroll amount becomes equal to the predetermined amount, causes a user not to conduct an erroneous operation. This allows the user to conduct a selecting operation at a timing when the scrolling speed decreases to such a degree that causes the user not to conduct an erroneous operation, even before the scrolling of the screen stops. It is therefore possible for the user to quickly and easily carry on an operation of an electronic device.

According to an aspect 4 of the present invention, the input control device as set forth in the aspect 1 is preferably arranged such that, in a case where the scrolling of the screen is started, the accepting operation control means controls the operation accepting means to lift the forbiddance of the accepting operation when a speed of the scrolling of the screen automatically decreases and reaches a predetermined speed.

According to the above configuration, the predetermined speed is set to such a degree that a scrolling speed causes a user not to conduct an erroneous operation. This allows the user to conduct a selecting operation at a timing when the scrolling speed decreases to such a degree that causes the user not to conduct an erroneous operation, even before the scrolling of the screen stops. It is therefore possible for the user to quickly and easily carry on an operation of an electronic device.

An electronic device in accordance with an aspect 5 of the present invention includes: a display device by which a screen is displayed so as to be scrolled, on which screen a display element, to be subjected to an operation conducted via a touch panel, is displayed; and an input control device for controlling an acceptance of the operation conducted via the touch panel, the input control device being an input control device recited in any one of aspects 1 through 4.

According to the above configuration, it is possible for a user to quickly and easily carry on an operation of the electronic device.

According to the aspect 6 of the present invention, the electronic device as set forth in the aspect 5 is preferably arranged such that the electronic device is a mobile phone.

Note that the input control device can be realized by a computer. In this case, the scope of the present invention encompasses (i) a program for causing a computer to operate as each means of an input control device and (ii) a computer readable recording medium in which a program is recorded.

INDUSTRIAL APPLICABILITY

The present invention is applicable to not only mobile phones but also any electronic devices with respect to which input operations can be conducted via touch panels.

REFERENCE SIGNS LIST

1 CPU
2 Display section (display device)
3 Touch panel
4 Display control section
5 Touch control section (input control device)
5a Touch control section (input control device)
5b Touch control section (input control device)
10 Mobile phone (electronic device)
20 Mobile phone (electronic device)
30 Mobile phone (electronic device)
51 Operation accepting section (operation accepting means)
52 Accepting operation control section (accepting operation control means)
53 Scroll stopping time calculating section
54 Forbiddance lifting time calculating section
55 Remaining scroll amount calculating section
56 Comparison section
57 Threshold storing section
58 Scrolling speed calculating section
59 Threshold storing section

The invention claimed is:

1. An input control device for use in an electronic device including a display device by which a screen is displayed so as to be scrolled, on which screen a display element, to be subjected to an operation conducted via a touch panel, is displayed, the input control device controlling an acceptance of the operation, said input control device comprising:
an operation accepting section that accepts the operation to be conducted with respect to the display element; and
a processing device and a memory device storing instructions that cause the processing device to:
control the operation accepting section to forbid an accepting operation, in a case where scrolling of the screen is started,
control the operation accepting section to lift forbiddance of the accepting operation before the scrolling of the screen automatically stops, in a case where the scrolling of the screen is started.

2. The input control device as set forth in claim 1, wherein,
the memory device stores instructions that further cause the processing device to:
control the operation accepting section to lift the forbiddance of the accepting operation a predetermined time before the scrolling of the screen automatically stops, in a case where the scrolling of the screen is started.

3. The input control device as set forth in claim 1, wherein, the memory device stores instructions that further cause the processing device to:

control the operation accepting section to lift the forbiddance of the accepting operation when a scroll amount, remaining until the scrolling of the screen automatically stops, becomes equal to a predetermined amount, in a case where the scrolling of the screen is started.

4. The input control device as set forth in claim 1, wherein, the memory device stores instructions that further cause the processing device to:

control the operation accepting section to lift the forbiddance of the accepting operation when a speed of the scrolling of the screen automatically decreases and reaches a predetermined speed, in a case where the scrolling of the screen is started.

5. An electronic device comprising:

a display device by which a screen is displayed so as to be scrolled, on which screen a display element, to be subjected to an operation conducted via a touch panel, is displayed; and an input control device for controlling an acceptance of the operation conducted via the touch panel, the input control device including:

an operation accepting section that accepts the operation to be conducted with respect to the display element; and a processing device and a memory device storing instructions that cause the processing device to:

control the operation accepting section to forbid an accepting operation, in a case where scrolling of the screen is started, control the operation accepting section to lift forbiddance of the accepting operation before the scrolling of the screen automatically stops, in a case where the scrolling of the screen is started.

6. The electronic device as set forth in claim 5, wherein the electronic device is a mobile phone.

7. A method of carrying out input control for use in an electronic device including a display device by which a screen is displayed so as to be scrolled, the method comprising the steps of:

causing an operation accepting section to accept an operation to be conducted with respect to a display element, while the screen on which the display element, to be subjected to the operation conducted via a touch panel, is being displayed;

causing a processing device to forbid an acceptance of the operation conducted with respect to the display element, in a case where scrolling of the screen is started; and causing the processing device to lift forbiddance of the acceptance of the operation before the scrolling of the screen automatically stops, in a case where the scrolling of the screen is started.

8. A non-transitory computer readable recording medium storing therein a program for causing a computer to operate as each instruction of an input control device for use in an electronic device including a display device by which a screen is displayed so as to be scrolled, on which screen a display element, to be subjected to an operation conducted via a touch panel, is displayed, the input control device controlling an acceptance of the operation, said input control device comprising:

an operation accepting section that accepts the operation to be conducted with respect to the display element; and a processing device and a memory device storing instructions that cause the processing device to:

control the operation accepting section to forbid an accepting operation, in a case where scrolling of the screen is started, control the operation accepting section to lift forbiddance of the accepting operation before the scrolling of the screen automatically stops, in a case where the scrolling of the screen is started.

9. The non-transitory computer readable recording medium, according to claim 8, wherein the memory device stores instructions that further cause the processing device to:

control the operation accepting section to lift the forbiddance of the accepting operation a predetermined time before the scrolling of the screen automatically stops, in a case where the scrolling of the screen is started.

10. A non-transitory computer readable recording medium, according to claim 8, wherein the memory device stores instructions that further cause the processing device to:

control the operation accepting section to lift the forbiddance of the accepting operation when a scroll amount, remaining until the scrolling of the screen automatically stops, becomes equal to a predetermined amount, in a case where the scrolling of the screen is started.

11. A non-transitory computer readable recording medium, according to claim 8, wherein the memory device stores instructions that further cause the processing device to:

control the operation accepting section to lift the forbiddance of the accepting operation when a speed of the scrolling of the screen automatically decreases and reaches a predetermined speed, in a case where the scrolling of the screen is started.

* * * * *